United States Patent [19]
Willem et al.

[11] 4,402,540
[45] Sep. 6, 1983

[54] EQUIPMENT FOR CLAMPING AND UNCLAMPING A CABLE ON AN INSULATING CAP

[75] Inventors: Michel Willem, Abrest; Lucien Gamet, Saint-Yorre, both of France

[73] Assignee: Societe Anonyme dite: Ceraver, Paris, France

[21] Appl. No.: 260,701

[22] Filed: May 5, 1981

[30] Foreign Application Priority Data

May 16, 1980 [FR] France .............................. 80 11015

[51] Int. Cl.³ ............................................. A47F 13/06
[52] U.S. Cl. .................................... 294/19 R; 294/24
[58] Field of Search ...................... 294/19 R, 24, 31.2; 24/284, 276; 174/169, 172, 173

[56] References Cited

U.S. PATENT DOCUMENTS

| 2,329,391 | 9/1943 | Cappellanti | 173/273 |
| 3,090,827 | 5/1963 | Mahaney | 174/172 |
| 4,263,478 | 4/1981 | Willem | 174/169 |

FOREIGN PATENT DOCUMENTS

| 403587 | 11/1909 | France . | |
| 1272161 | 8/1961 | France . | |
| 1272546 | 8/1961 | France . | |
| 78750 | 7/1962 | France . | |
| 2426318 | 12/1979 | France | 174/169 |

*Primary Examiner*—James B. Marbert
*Attorney, Agent, or Firm*—Kenyon & Kenyon

[57] ABSTRACT

A tool having two side rods spaced apart by a connecting crossbar facilitates clamping and unclamping a cable in a groove on an insulator cap. To clamp the cable, the crossbar is inserted into a first recess on the cap between the groove and a protruding stud, and the side rods are pressed against a front branch of a clamp wire pivotally mounted on the cap to snap the front branch into a second recess below a front guide surface on the stud. To unclamp the cable, hooked extensions of the side bars engage the front branch of the clamp wire and lift it out of the second recess when the crossbar is pressed against the front guide surface of the stud. Separate clamping and unclamping tools can be mounted on an insulating handle for pivoting between a rest position and an operating position and spring biassing means can be provided to urge each tool toward a rest position.

14 Claims, 18 Drawing Figures

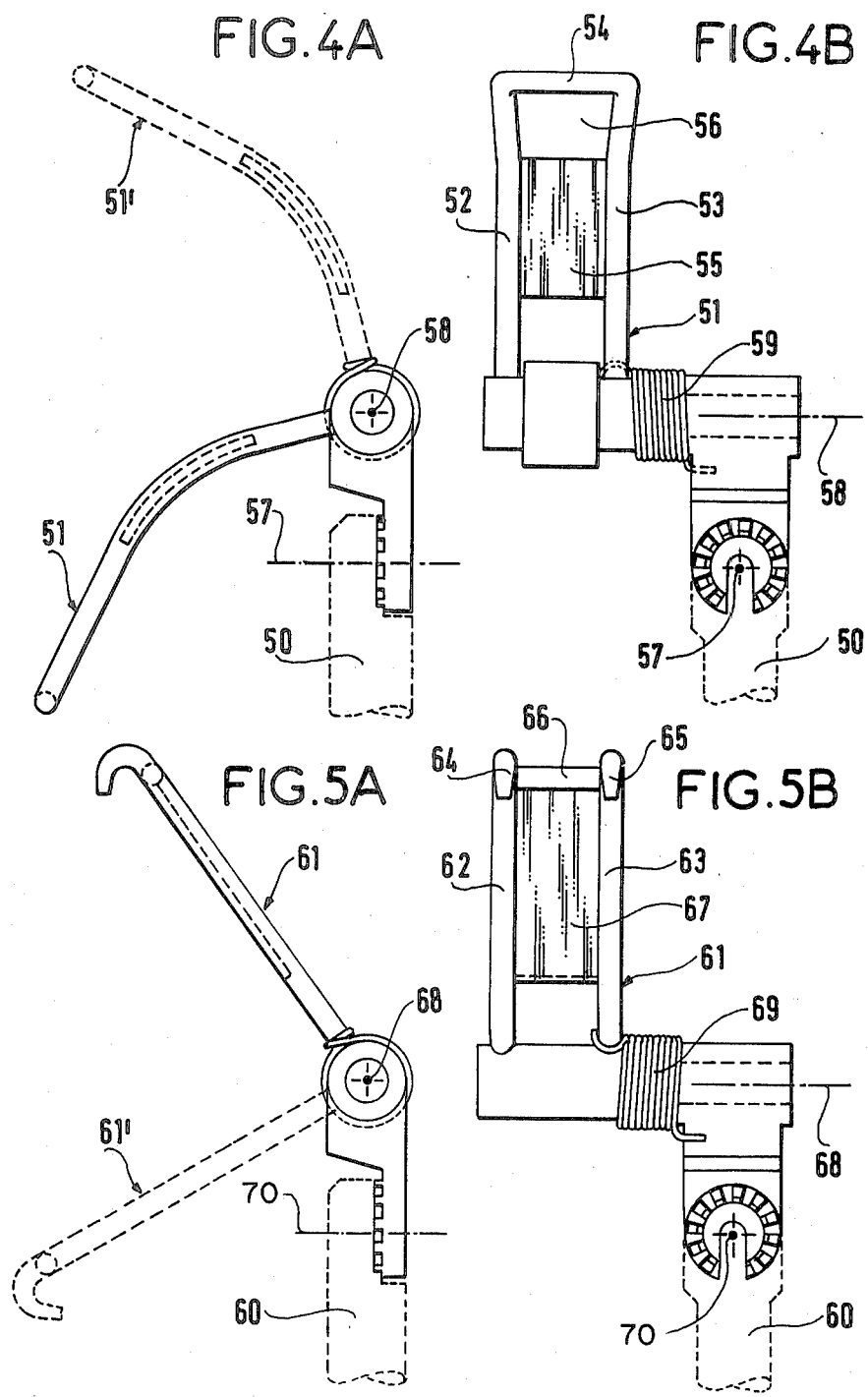

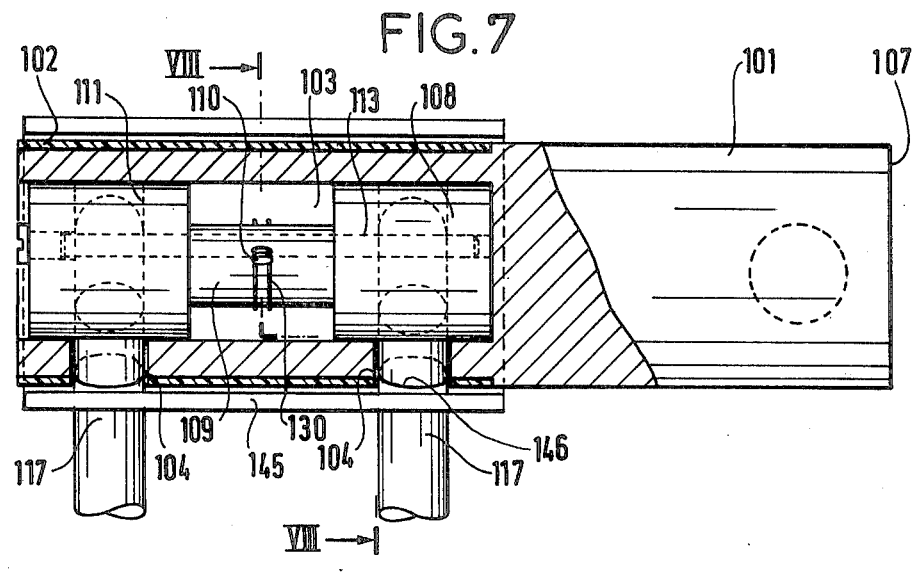
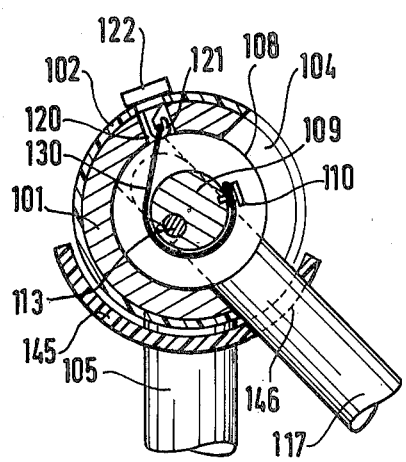
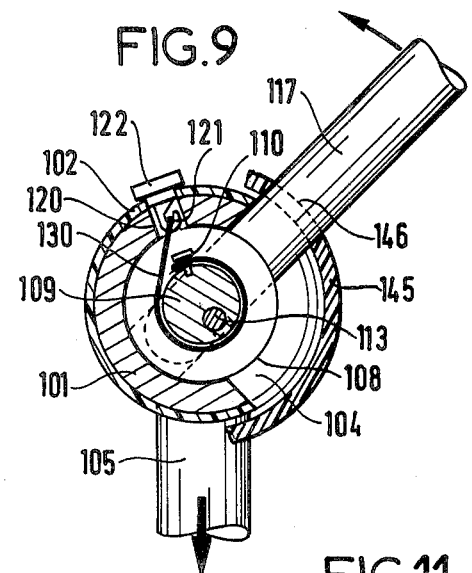
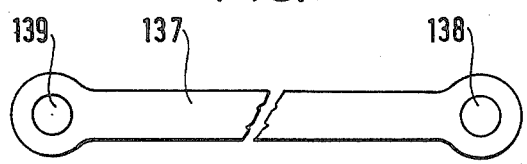
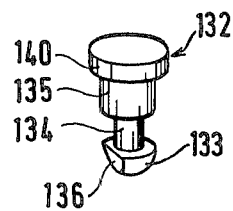

EQUIPMENT FOR CLAMPING AND UNCLAMPING A CABLE ON AN INSULATING CAP

The present invention relates to equipment for clamping and unclamping a cable on an insulating cap.

BACKGROUND OF THE INVENTION

French patent No. 2 426 318 filed May 18, 1978, describes a system for mechanically fixing a cable on a cap of an insulator.

The cap has a groove which forms a housing to accommodate the cable; a moving part constituted by a chock is hinged to the cap by a resilient fastening means snap-fitted on a stud and thus allowing the cable to be clamped in its housing.

The present invention aims to produce equipment which enables remote clamping and unclamping of a cable on an insulating clamp to be performed easily.

The idea of the invention is to adapt firstly the shape of the cap and of its accessories and secondly the shape of the clamping and unclamping tools so that they co-operate with each other and thus make operation easy and safe for an operator.

SUMMARY OF THE INVENTION

The present invention provides equipment for clamping and unclamping a cable to an insulator cap, said cable being cradled in a groove on said insulator cap, said cap being substantially symmetrical about a plane of symmetry passing through the axis of the groove and being provided with:

a chock to keep said cable in its housing;

a resilient clip for said chock, said clip being constituted by a metal wire bent to form a front branch and two side branches whose ends are made fast with said chock; and a protruding stud spaced from the groove with a first guide surface facing toward the groove, a second guide surface facing away from the groove and terminating in a lower surface which defines a recess parallel to said groove for holding said front branch of said clip in the clamping position;

the equipment including at least one tool constituted by two side rods which are capable of co-operating with two portions of said front branch of the clip on either side of said protruding stud, said side rods being connected together by a cross bar which is capable of co-operating with one of said first and second guide surfaces of said protruding stud.

Said tool may be a clamping means: its side rods press against said portions of said front branch of the clip on either side of the protruding stud; its cross bar co-operates with said second guide surface of the protruding stud.

Said tool can be an unclamping means: its side rods end respectively in two side hooks designed to hook onto said portions of said front branch of the clip on either side of said protruding stud; its cross bar co-operates with the first guide surface of the protruding stud.

The equipment in accordance with the invention advantageously includes a clamping means and an unclamping means assembled on the same insulating rod or at the ends of two independent insulating rods.

According to one particularly advantageous embodiment, the gaps between the side branches of the resilient clip and the protruding stud are chosen so that the side rods of the clamping tool or the side hooks of the unclamping tool can easily be inserted; however, it is preferable for them not to be too big so that they provide extra guidance for the tools.

The protruding stud co-operates with a second stud constituted by the end of a rib situated in the plane of symmetry of the cap; these two studs define a recess parallel to the housing and allow the cross bar of the clamping tool to be held more firmly during operation.

The present invention also provides equipment of the above-mentioned type which is particularly suitable for operation on live equipment and avoids danger of short circuits; indeed, short circuits would cause arcing which might dazzle the operator or even burn him by projecting molten metal and could also trigger the line protection system. In this unit, the various components are practically all insulating.

In accordance with one particularly advantageous embodiment of the invention, the clamping tool and the unclamping tool are respectively integral with two parts made of a resilient insulating substance fixed to one end of an insulating bar which is itself connected to the end of an insulating rod.

These two parts can be made integral with both ends of a single bar or each with one end of two independent bars.

Said bars are preferably constituted by cylinders made of agglomerated glass fibres provided with a sheath of insulating substance e.g. an elastomer such as EPDM.

In accordance with a preferential variant, the two parts are injected on opposite ends of the sheathed cylinder, the actual tools being disposed as inserts in the injection mould. Then, during operation, the elasticity of these two parts varies the angle formed by the axis of the cylinder and that of the tool.

BRIEF DESCRIPTION OF THE DRAWINGS

Other characteristics and advantages of the invention become apparent from the following non-limiting description given by way of illustration with reference to the accompanying drawings in which:

FIGS. 4A and 4B are partial side and front views respectively of a clamping tool in accordance with the invention, associated with an insulating rod for operating at a distance;

FIGS. 5A and 5B are partial views analogous to those of FIGS. 4A and 4B but relate to the unclamping tool in accordance with the invention;

FIG. 7 is a partially cut away elevation of the tool of FIG. 6 after its components have been assembled;

FIGS. 8 and 9 are cross-sections along line VIII—VIII of FIG. 7 showing the tool respectively in the rest position and in the working position;

FIG. 10 shows an elastic band which constitutes a variant of the ring illustrated in FIG. 6;

FIG. 11 illustrates a stud associated with the band of FIG. 10;

DESCRIPTION OF PREFERRED EMBODIMENTS

Figure 1:
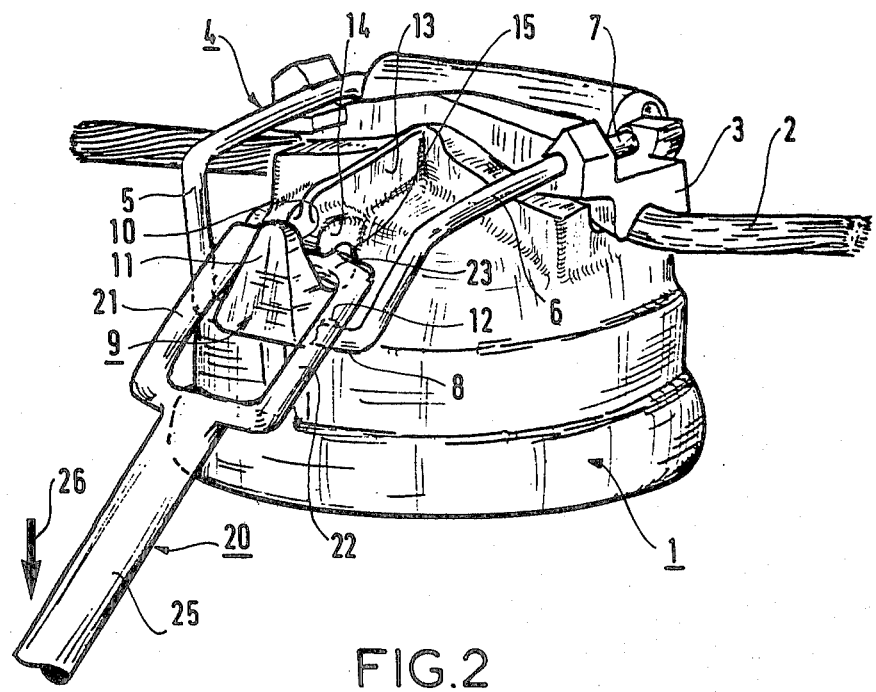
FIGS. 1 and 2 are perspective views of equipment in accordance with the invention during clamping and unclamping operations respectively.
Figure 2:
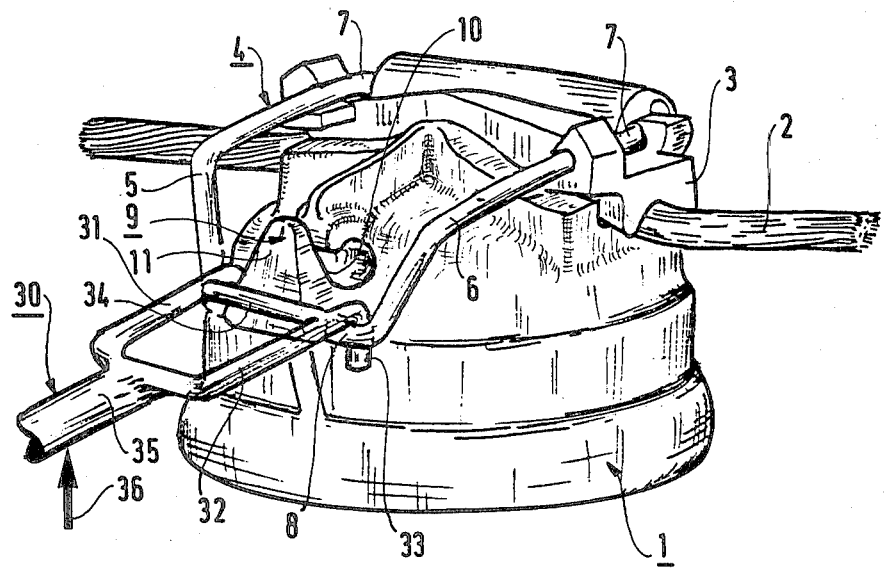

FIGS. 1 and 2 illustrate a metal or metal alloy insulator cap 1 designed to support a cable 2 which is cradled in a groove in the form of a portion of a cylinder which is flared at both ends; it is observed that the plane of symmetry of the cap is substantially orthogonal to the axis of this groove.

The cable is held in its groove by a longitudinal chock 3 which can be made of metal or of an insulating material and is associated with a resilient clip 4. This clip is constituted e.g. by a bent metal wire and has a front branch 8 and two side branches 5 and 6 whose ends are bent back and made fast with the chock 3. These figures also illustrate a visible portion 7 of the end of a side branch 6. A first stud 9 projecting from the cap has a first guide surface 10 which faces the groove, a second guide surface 11 and a lower surface 12 in the form of a portion of a cylinder which, with the wall of the cap, defines a recess for the front branch 8 of the resilient clip. The cap also has a central rib 13 situated substantially in its plane of symmetry and ending in a second projecting stud 14 which, with the first guide surface 10 of the projecting stud 9, defines a substantially cylindrical groove 15 parallel with the groove for the cable 2.

The equipment in accordance with the invention includes a clamping tool 20 (FIG. 1) and an unclamping tool 30 (FIG. 2) which co-operate with the studs and the resilient clip associated with the cap to make it easy to clamp and unclamp the cable 2 in its groove.

The clamping tool 20 mainly comprises a handle 25 which ends in two side branches 21 and 22 connected together by a cross bar 23. The dimensions of the stud 9 and of the housing 15 and the spacing apart of the branches 5 and 6 and that of the rods 21 and 22 are chosen so that when the cross bar 23 is slid over the rib 13, it falls into the groove 15 so that the rods 21 and 22 are placed on either side of the stud 9 and are applied against two portions of the front branch 8 of the clip 4.

The side clearance is chosen so as to facilitate the positioning of the tool 20 while allowing it to be guided between the branches 5 and 6 of the clip. It can easily be understood that moving the tool 20 downwards as schematically illustrated by the arrow 26 keeps the cross bar 23 in the groove 15 and allows the rods 21 and 22 to snap the front branch 8 of the resilient clip 4 under the stud 9 into the recess defined by the lower surface 12.

As schematically shown, the unclamping tool 30 has a handle 35 which ends in two side rods 31 and 32 whose bent ends form two hooks, only one of which, referenced 33, can be seen in the figure. A cross bar 34 connects the side rods 31 and 32 together. As in the case of the clamping tool, these side rods are spaced apart in accordance with the dimensions of the stud 9 and with the spacing apart of the side branches 5 and 6 of the clip.

To unclamp, the hooks 33 of the rods 31 and 32 are disposed on the front branch 8 of the clip on either side of the stud 9 so that the second guide surface 11 of this stud serves as a guide and bearing surface for the cross bar 34. It is obvious that it is easy to remove the front branch 8 of the clip from the surface 12 by an upward movement of the tool, as schematically shown by the arrow 36.

Figure 3A:
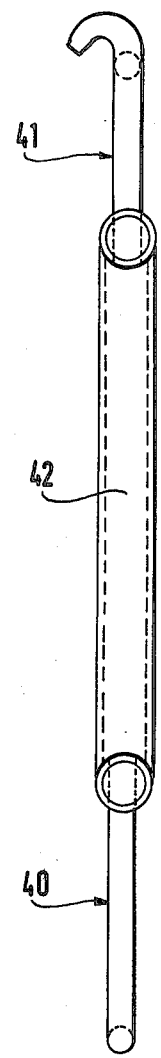
FIGS. 3A and 3B are side and front views respectively of a clamping tool and an unclamping tool in accordance with the invention, both located on a common handle.
Figure 3B:
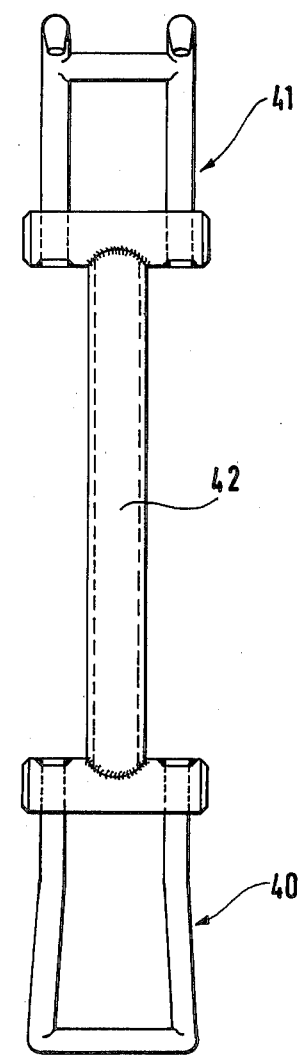

FIGS. 3A and 3B illustrate a clamping tool 40 and an unclamping tool 41 which are respectively analogous to the tools 20 and 30 of FIGS. 1 and 2. They are made of metal and are disposed at respective ends of a common handle 42 the length of which may be about twenty or so centimeters.

For remote operation, the tools are disposed on rods which are very much longer than the above-described handles and which are insulating.

FIGS. 4A and 4B illustrate a metal clamping tool 51 assembled on an insulating rod 50 only one end of which is seen. FIG. 4A illustrates the two side rods 52, 53 and the cross bar 54. A metal plate 55 is integral with the side rods 52 and 53 so as to reinforce the tool and to facilitate the guiding thereof on the central rib 13 of the cap 1. An opening 56 is provided between this plate 55 and the cross bar 54 to leave a passage for the stud 9. The tool is also connected to the rod 50 by a mechanical system which permits the tool to be rotated firstly about a pin 57 and secondly about an axis 58 which is orthogonal to the pin 57.

The rest position of the clamping tool 51 is shown in solid lines in FIG. 4A; its working position (referenced 51') is shown in dashed lines. A return spring 59 which makes the clamping tool rotate about the axis 58 makes it pass from its working position to its rest position. It is easier for an operator operating from a distance to have both of these tool positions available.

In an analogous way, FIG. 5A and FIG. 5B illustrate an unclamping tool 61 in its rest position and in its working position 61'.

The rest and working positions are inverted relative to those of the clamping tool. The tool 61 has two side rods 62 and 63 which end in two hooks 64 and 65 and are connected together by a transverse rod 66 and a plate 67. When operating at a distance, this plate prevents the stud 9 from being inserted between the rods 62 and 63.

Further, FIGS. 5A and 5B illustrate an insulating rod 60, the axis of rotation 70 of the tool 61 about the rod and the pin 68 about which the tool rotates under the effect of the spring 69.

FIGS. 6 to 12 relate to insulated clamping tools which form part of equipment in accordance with the invention. The unclamping tools are easily deduced therefrom taking into consideration what is set forth above. The clamping tool of FIG. 6 includes an insulating cylinder 101 made of resin and of glass fibres and coated with an adhesive sheath 102 made of a resilient insulating substance e.g. EPDM or silicone rubber which withstands erosion and creep well. The cylinder 101 is about 150 mm long and about 40 mm in diameter; the sheath 102 is about 2.5 mm thick. The cylinder 101 is hollow at one end only along a length of about 80 mm and forms a hollow recess 103 which is about 25 mm in diameter and whose axis is the same as that of the cylinder 101.

Further, the cylinder 101 is machined in its portion which has become tubular to form two slots 104 whose function is described hereinafter. Also, near the other end of the cylinder 101, there is a blind hole which is about 30 mm deep and whose axis is perpendicular to that of the cylinder 101. The blind hole has a diameter of about 16.6 mm.

A sheathed cylinder 105 about 16 mm in diameter whose end is sealed in a socket 106 with a flattened and grooved end which is to be fixed on the end of the insulated rod partially illustrated is fitted and glued into this hole. The sheathed cylinder 105 has an elastomer fin 131 which increases the arc-over voltage of the tool by lengthening the leakage distance and the arc distance.

The end 107 of the cylinder 101 is coated with a disk made of the same resilient insulating substance as the sheath 102, on which it is glued. (The disk is not illustrated).

The part 108 is slightly smaller than the recess 103 of the cylinder 101 to be able to turn freely therein; the central portion of the part 108 is machined to form a cylindrical neck 109 about 15 mm in diameter. It has a blind hole in which is inserted a stud 110 about 5 mm in diameter. The part 108 is made of an insulating self-lubricating substance such as Natene or Teflon.

The part 108 also has two blind holes 111 about 25 mm deep and 12.5 mm in diameter. The axes of these holes are perpendicular to the axis of the part 108, which also has a blind hole 112 parallel to its axis. The diameter of the blind hole 112 is about 5 mm and the blind hole communicates partially with the holes 111; it is designed to accommodate a pin 113 made of an insulating substance, e.g. nylon.

A part 114 has a pin 115 integral with two sockets 116; the pin and the sockets can optionally be made of metal. Two fibre glass resin rods 117 which are about 12 mm in diameter are sealed respectively in the sockets 116 and each has a notch 118 whose radius is equal to that of the pin 113: they are advantageously sheathed up to sockets 116 with EPDM (or a silicone elastomer or the like). The part 114 is stiffened preferably by a brace 119.

There is also provided a shield 145 made of an insulating substance that withstands erosion and creeping well and is in the form of a portion of a cylinder. It may be pressed against the cylinder 101; this shield has two holes 146 in which the sheathed rods 117 may be inserted and fixed; it also serves as a stiffening brace for the part 114.

To assemble the insulating tool assembly firstly, the neck 109 of the part 108 is furnished with an elastic ring 130 around the neck 109 and held at each end by the stud 110. The part 108 is inserted into the recess 103 of the cylinder 101.

The shield 145 is fitted on the rods 117, and then the rods 117 are inserted into the holes 111 of the part 108 through the slots 104. The part 108 is made integral with the cylinder 101 by inserting the pin 113 into the hole 112 and through the notches 118 of the rods 117.

The tool 114 is rotated until the rods 117 are brought to the upper ends of the slots 104; in this position, the stud 110 of the part 108 registers with a bore 120 in the tubular portion of the cylinder 101. A hook is used to remove one end of the elastic ring from the stud 110 and to withdraw it through the bore 120, where it is placed in a notch 121 of a stud 122 made of an insulating substance such as nylon, which stud has a shoulder that is pressed against the tool by the tension of the elastic ring. The function of the elastic ring is to maintain the tool 114 in the lower position when it is at rest. This facilitates the opening operation.

If a greater urging force is required, the elastic ring 130 can be replaced by an India rubber band 137 illustrated in FIG. 10. This band has a hole 138 at one end for the stud 110 and a hole 139 at the other end for the stud which is inserted in the bore 120.

In this case, the stud can be substantially cylindrical, as in the embodiment of FIG. 11, which shows a stud 132 with a lower portion 133 which is substantially hemispherical except for a flat edge 136 for passing the India rubber band into the bore 120. Above portion 133 is a cylindrical portion 134 whose diameter is almost the same as that of the stud 110, then a cylindrical portion 135 whose diameter is slightly smaller than that of the bore 120, then a flange 140 whose diameter is a little larger than that of the bore 120. (In this case, the bore 120 is advantageously cylindrical).

The maximum diameter of the portion 133 of the stud 132 can advantageously be a little larger than the diameter of the hole 139 so that the India rubber band clasps the portion 134 of the stud 132. The India rubber band 137 can be reinforced at each end by glueing an India rubber disk (not shown) thereon, prior to punching the holes 138 and 139.

Figure 6:
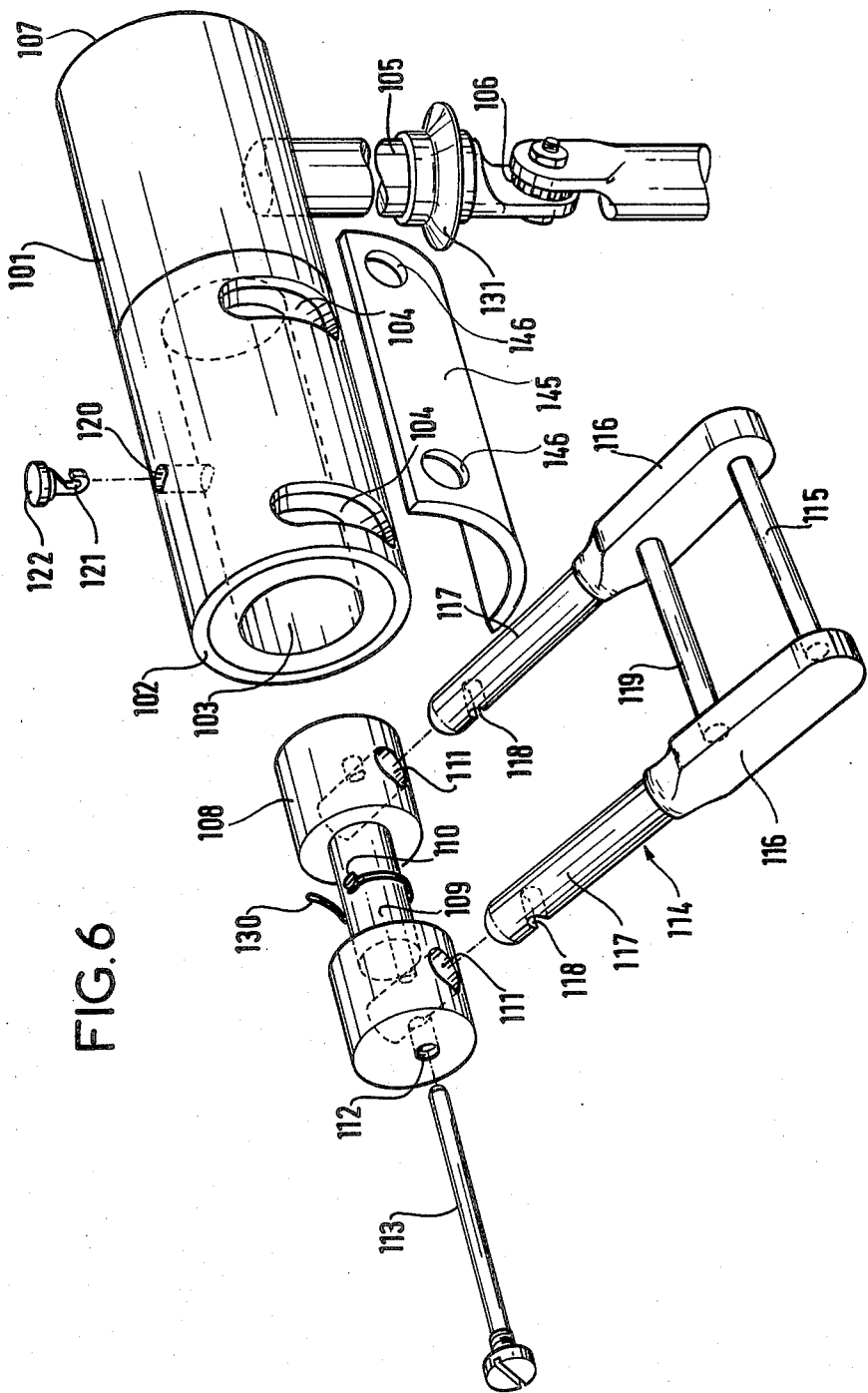
FIG. 6 is an exploded perspective view of an alternative embodiment of an insulating clamping tool in accordance with the invention.
Figure 12:
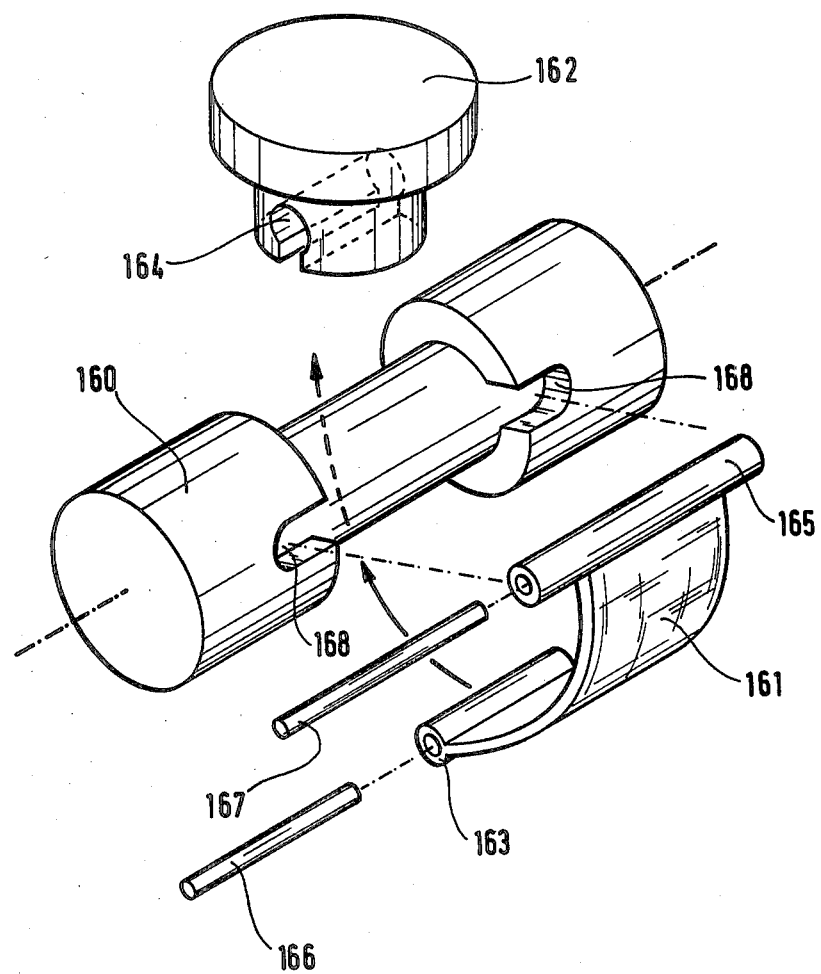
FIG. 12 is a perspective view of a variant of a part which belongs to the insulating tool of FIG. 6.

FIG. 12 illustrates a part 160 which constitutes a variant of the part 108 in FIG. 6 and a stud 162 which constitutes a variant of the stud 122 in FIG. 6. The part 160 has two opposed recesses 168 at either side of a central neck portion on a line parallel to its axis. Spring return is provided by a India rubber or elastomer belt 161 having two end beads 163 and 165 which can be reinforced respectively by two nylon rods 166 and 167.

The belt 161 fits into the central neck portion of the part 160, with the ends of bead 165 engaging in the two recesses 168 and the bead 163 engaging in the recess 164 of the stud 162.

Figure 13:
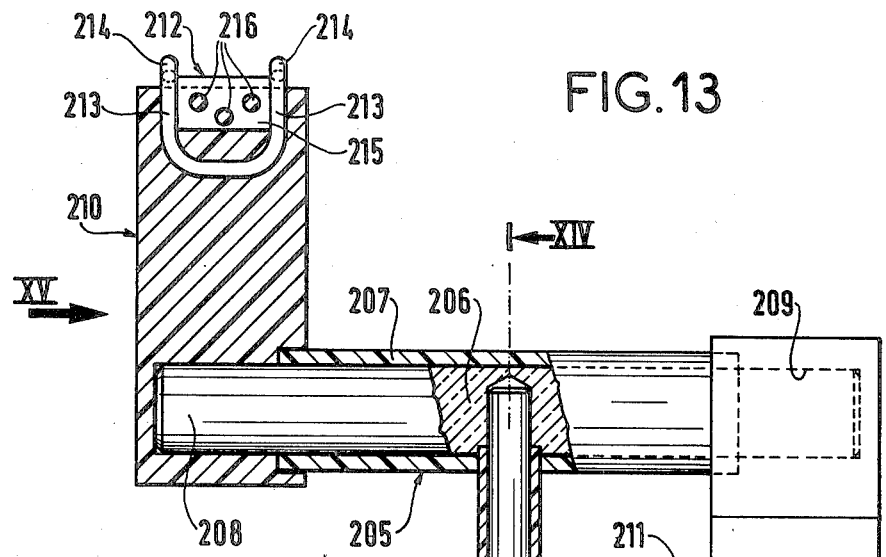
FIG. 13 is a partially cut away general view of a varient of a clamping and unclamping tool in accordance with the invention.
Figure 14:
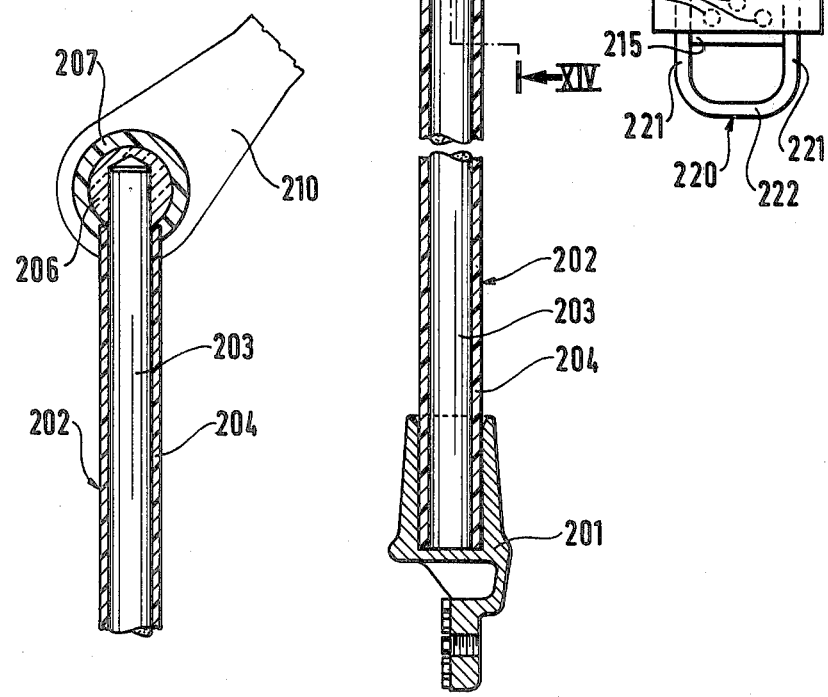
FIG. 14 shows a detail along the section line XIV—XIV of FIG. 13.
Figure 15:
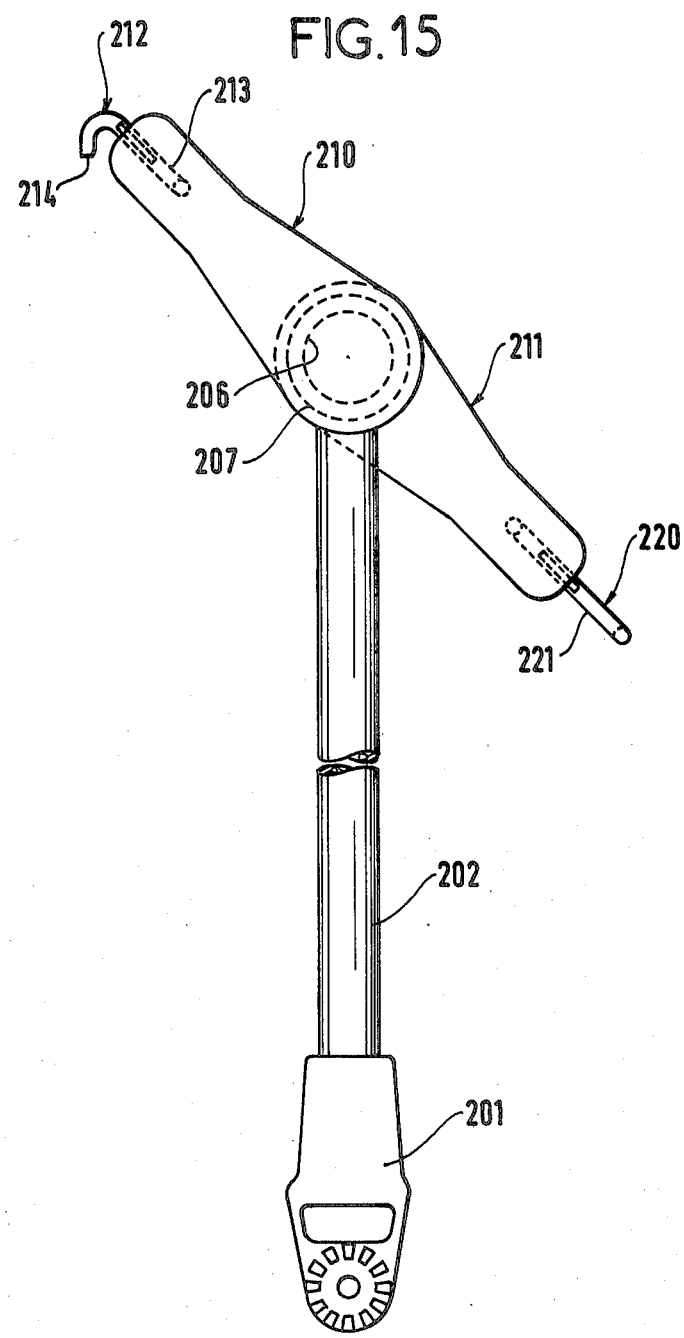
FIG. 15 is an elevation in the direction XV of FIG. 13.

FIGS. 13 to 15 show a handle 202 constituted by a rod 203 made of glass fibres and resin and covered with an elastomer sheath 204 assembled in an end piece 201 for connection to a universal insulating rod (not shown). (This end piece allows the angle formed by the axis of the rod and the axis of the handle 202 to be varied). The rod 203 is fitted and glued in a core 206 of a member 205 which is perpendicular to it. The core 206 is covered by a sheath 207 made of an elastomer such as EPDM except at its ends 208 and 209, on which two supports 210 and 211 are also made of a resilient insulating substance such as EPDM, are fixed, for example, by injection molding.

The support 210 serves as a support for an unclamping tool 212 which has in particular two side rods 213 which end in hooks 214 and connected by a transverse plate 215 in which holes 216 are formed. The unclamping tool is disposed in the mould as an insert when the support 210 is being moulded; the insulating substance then enters the holes 216 to form fixing means. The same applies to clamping tool 220 which has two side rods 221 and a transverse rod 222 and is molded into the support 211.

When opening and closing in the same way as with the tools 20 and 30 of FIGS. 1 and 2, the elasticity of the supports 210 and 211 makes the planes of the tools 212 and 220 turn about the axis of the cylinder 206.

It is seen that the device in accordance with the invention have no moving parts and that they are completely protected against outside dampness by sealing with an insulating substance. They are simpler and cheaper to produce than previous devices.

Of course, the invention is not limited to the embodiments which have just been described. In particular, the two tools can be independent from each other and can be fixed to two independent insulating bars which can optionally be assembled together on a single rod.

We claim:

1. Equipment for clamping and unclamping a cable in a groove on an insulator cap having a resilient clamp including a metal wire bent to form a front branch between two side branches, the free ends of which are connected to the cap for pivoting about an axis on one side of the grove, and a protruding stud on the other side of the groove having a first guide surface facing toward the groove and terminating in a first recess having a first downward facing bearing surface, a second guide surface facing away from the groove and terminating at a second recess having a second downward facing bearing surface for engaging the front branch of the clamp wire in the clamping position, wherein the clamping and unclamping equipment comprises:

a tool having two spaced apart side rods which are adapted to contact the front branch of the clamp wire on either side of the protruding stud of such an insulator cap, a crossbar connecting said side rods adjacent one end of each of said side rods and adapted to cooperate with one of the first and second guide and bearing surfaces of the protruding stud when said side rods contact the front branch of the clamp wire of such a cap, and two side hooks, each side hook being formed at the respective one end of each side rod and extending beyond the crossbar in a plane perpendicular to the crossbar;

a handle connected to the other ends of said side rods for manipulating the tool, said side hooks being adapted to hook onto portions of the front branch of the clamp wire on either side of the protruding stud of such a cap when said crossbar is in contact with the second guide surface of the protruding stud for disengaging the front branch from the second recess upon upward movement of the handle.

2. Equipment according to claim 1, wherein said side rods are adapted to press against portions of a front branch of such a clamp wire on either side of the protruding stud of such a cap when said crossbar is pressed against the bearing surface of the first recess of such a cap by downward pressure on said handle for snapping the front branch of the clamp wire into engagement with the bearing surface of the second recess.

3. Equipment according to claim 2, further comprising a plate connecting said side rods of said tool, said plate being spaced from said crossbar to provide a passage for the protruding stud of such an insulator cap.

4. Equipment according to claim 1, wherein said tool further comprises a plate connecting said side rods between the crossbar and said other end to prevent said crossbar from coming into contact with the first guide surface of the protruding stud of such a cap.

5. Equipment according to claim 1, wherein said handle comprises an insulating rod, and the equipment further comprises means for connecting said tool at one end of said insulating rod and adjustable to rotate the tool about said end.

6. Equipment according to claim 1, wherein said tool is rotatable with respect to said handle between a working position and a rest position, and the equipment further comprises a return spring for urging the tool to rotate toward said rest position.

7. Equipment according to claim 6, wherein said handle comprises an insulating rod, and the equipment further comprises a support made of an insulating substance for fastening the tool to the handle.

8. Equipment according to claim 7, wherein said support comprises an outside part which is integral with said rod and has an internal cylindrical recess, an internal cylindrical part fitting slidably and coaxially in said internal recess and wherein said side rods of said tool pass through circumferential slots in said outside part and are fixed in said inside part orthogonally to its axis, and an elastic means fixed firstly to said inside part and secondly to said outside part allowing a rotating movement of said tool about said axis between a working position at one end of said slots and a rest position at the other end of said slots and for urging the tool toward said rest position.

9. Equipment according to claim 8, wherein the portions of said side rods fixed in said inside part comprise insulating cylinders.

10. Equipment according to claim 8, wherein said elastic means is fixed to said outside part by a stud which is accessible from the outside of the said support.

11. Equipment according to claim 1 further comprising a second tool having two spaced apart side rods and a crossbar connecting said side rods at one end of each side rod, said second tool constituting a clamping tool whose side rods are adapted to press against portions of a front branch of a clamp wire on either side of a protruding stud of such a cap when its crossbar is in contact with the first guide and bearing surfaces of the protruding stud, and and said first tool constitutes an unclamping tool.

12. Equipment according to claim 11, wherein said clamping tool and unclamping tools are each integral with a support made of a resilient plastic insulating substance fixed to one end of an insulating bar which is itself connected to one end of an insulating rod, said resilient plastic support being bendable between a rest position and a working position for said tool.

13. Equipment according to claim 12, wherein said support is surface moulded over the end of said insulating bar and onto the other ends of the side bars of said clamping and unclamping tools.

14. Equipment according to claim 12, wherein said bar is made of glass fibres and resin covered with a sheath made of an insulating substance.

* * * * *

UNITED STATES PATENT AND TRADEMARK OFFICE
CERTIFICATE OF CORRECTION

PATENT NO. : 4,402,540
DATED : 6 September 1983
INVENTOR(S) : Michel WILLEM

It is certified that error appears in the above—identified patent and that said Letters Patent is hereby corrected as shown below:

In the Title: change "INSULATING" to --INSULATOR--.

Column 6, line 64: change "device" to --devices--.

Signed and Sealed this

Twenty-ninth Day of November 1983

[SEAL]

Attest:

GERALD J. MOSSINGHOFF

Attesting Officer

Commissioner of Patents and Trademarks